United States Patent [19]
Perry et al.

[11] Patent Number: 4,846,134
[45] Date of Patent: Jul. 11, 1989

[54] APPARATUS AND METHOD FOR REMOVING AND BURNING HYDROCARBON VAPORS USING AN INTERNAL COMBUSTION ENGINE

[75] Inventors: Joseph W. Perry, Buena Park; Jonathan T. Uhl, Brea; Thomas L. Davis, Long Beach; David E. Potts, La Mirada, all of Calif.

[73] Assignee: V. R. Systems, Inc., Buena Park, Calif.

[21] Appl. No.: 175,203

[22] Filed: Mar. 30, 1988

[51] Int. Cl.$^4$ ............................................. F02M 39/00
[52] U.S. Cl. ...................................... 123/520; 141/52; 123/518; 123/525
[58] Field of Search ......................... 123/525, 518–521, 123/519, 516; 141/52; 166/267, 268, 313, 370

[56] References Cited

U.S. PATENT DOCUMENTS

| | | | |
|---|---|---|---|
| 3,581,782 | 6/1971 | Onufer | 123/518 |
| 3,640,257 | 2/1972 | Cornelius | 123/518 |
| 3,874,427 | 4/1975 | Tiggelbeck | 141/52 |
| 3,914,095 | 10/1945 | Straitz | 141/52 |
| 3,926,230 | 12/1975 | Stary | 127/518 |
| 4,069,666 | 1/1978 | Nakamura . | |
| 4,087,964 | 5/1978 | Miyagi . | |
| 4,127,088 | 11/1978 | Ezoe . | |
| 4,127,097 | 11/1978 | Takimoto | 123/520 |
| 4,134,261 | 1/1979 | Iizuka et al. . | |
| 4,166,485 | 9/1979 | Wokas | 141/52 |
| 4,235,843 | 11/1980 | Tadokoro . | |
| 4,393,848 | 7/1983 | Poehlman | 123/525 |
| 4,416,214 | 11/1983 | McDonald . | |
| 4,421,087 | 12/1983 | Schuurman | 123/525 |
| 4,440,137 | 4/1984 | Lagano . | |
| 4,513,727 | 4/1985 | Lagano et al. . | |
| 4,523,548 | 6/1985 | Engel et al. . | |
| 4,535,728 | 8/1985 | Batchelor . | |
| 4,593,760 | 6/1986 | Visser et al. . | |
| 4,594,201 | 6/1986 | Phillips et al. . | |
| 4,617,904 | 10/1986 | Pagiin | 143/525 |
| 4,625,511 | 12/1986 | Scheitlin . | |
| 4,638,777 | 1/1987 | Fanner et al. . | |
| 4,641,625 | 2/1987 | Smith . | |
| 4,660,639 | 4/1987 | Visser et al. . | |
| 4,686,951 | 8/1987 | Snyder . | |

OTHER PUBLICATIONS

Walter L. Crow et al., "Subsurface Venting of Vapors Emanating from Hydrocarbon Product on Ground Water," Ground Water Monitoring Review, Winter, 1987, Waterwell Journal Publishing Company, Dublin, Ohio.

Walt L. Crow et al., "Subsurface Venting of Hydrocarbon Vapor from an Underground Aquifer," Health and Enviromental Sciences Department, API Publication No. 4410, Sep., 1985, American Petroleum Institute, Washington, D.C.

J. Scott Thornton et al., "Venting for the Removal of Hydrocarbon Vapors From Gasoline Contaminated Soil," Journal of Environmental Science and Health, A 17 No. 1, 1982, p. 31.

*Primary Examiner*—Carl Stuart Miller
*Attorney, Agent, or Firm*—Christie, Parker & Hale

[57] ABSTRACT

An apparatus and method are disclosed for accumulating hydrocarbon vapor and rendering the vapor environmentally safe by combustion. An internal combustion engine is attached to an interface which accumulates hydrocarbon vapor present in the soil after a spill or leakage from a storage tank or transfer lines. The vacuum of the internal combustion engine present in the intake manifold is used to draw the hydrocarbon vapors from the soil into the interface and then into the engine where they are burned. A catalytic converter of conventional design cleans the end exhaust removing any remaining hydrocarbon pollutants.

9 Claims, 2 Drawing Sheets

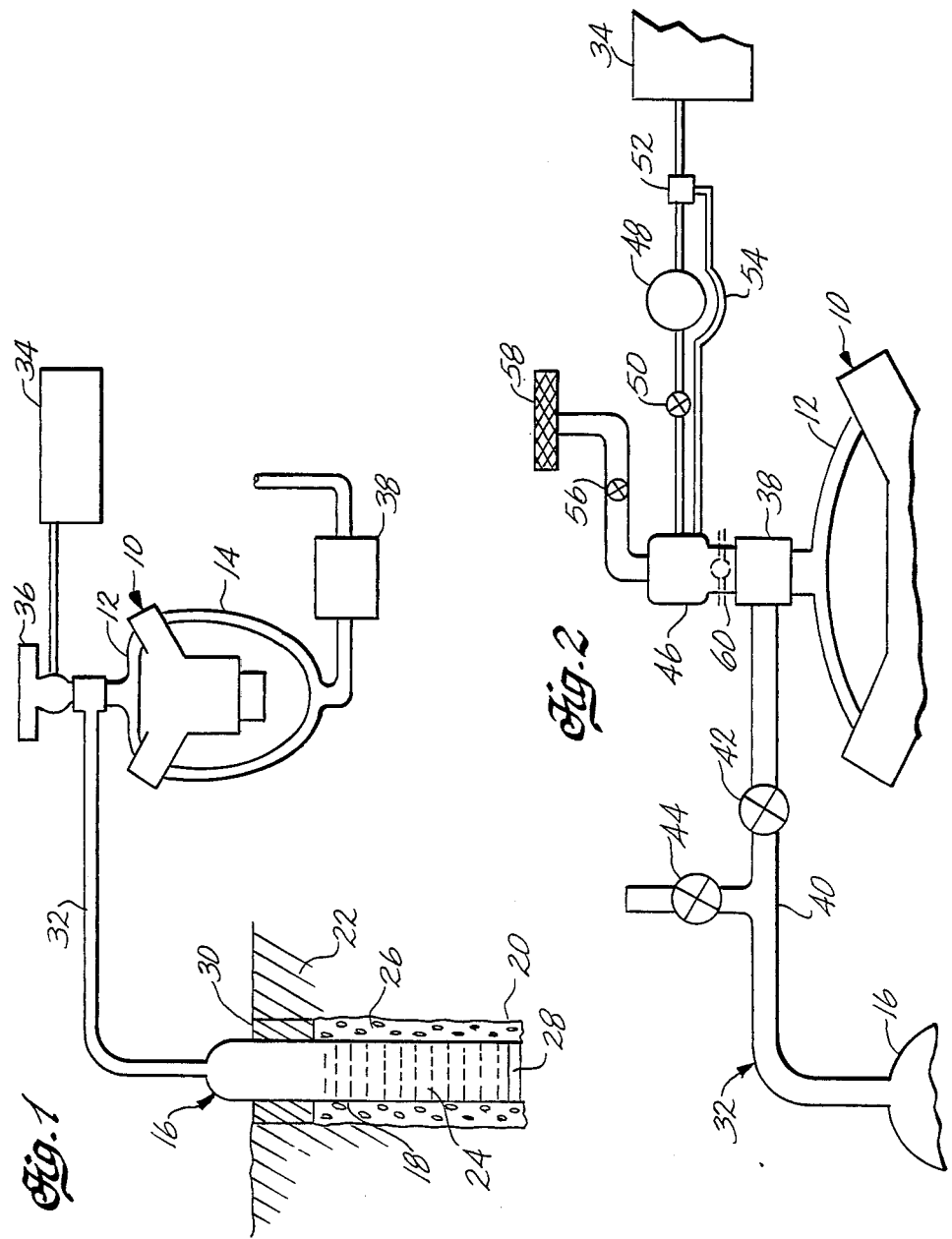

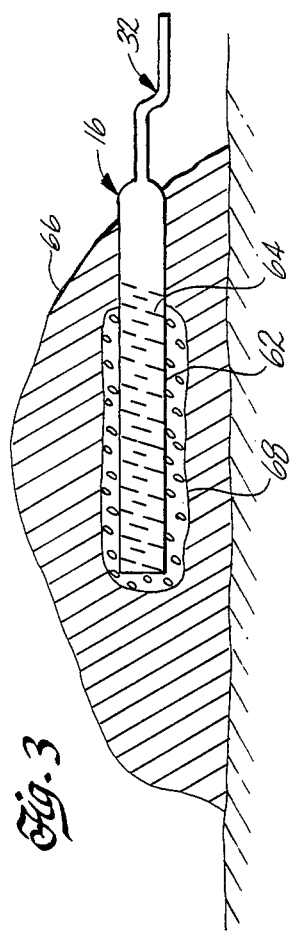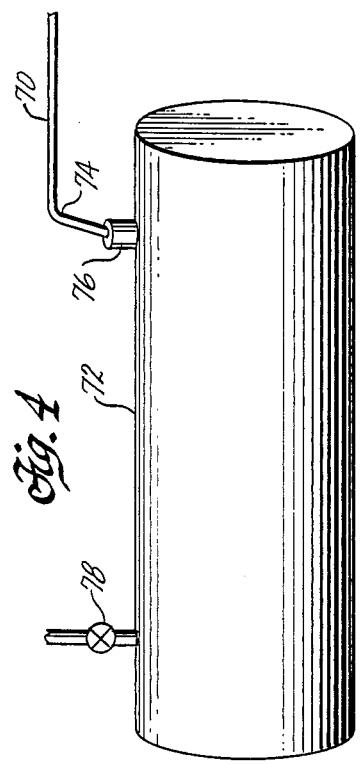

APPARATUS AND METHOD FOR REMOVING AND BURNING HYDROCARBON VAPORS USING AN INTERNAL COMBUSTION ENGINE

This invention relates generally to the removal of hydrocarbon pollutants in vapor form from contaminated soil and from storage tanks. Particularly, the invention as described in the specification uses an internal combustion engine as a source of vacuum to volatilize hydrocarbon pollutants, draw the vapor generated into the intake manifold of the engine, and then combust the hydrocarbon vapor to render it environmentally safe.

BACKGROUND OF THE INVENTION

Spills or leaks of hydrocarbon fuels from storage tanks, transfer lines, transports and the like may contaminate soil at the location of the spill. Removal of the hydrocarbon fuels from the soil is often required to protect the environment.

Hydrocarbon vapors which remain in empty fuel storage tanks, both underground and above ground, or transportable tanks must often be removed. Removal of the hydrocarbon vapor, or degassing, inerts the atmosphere in the tank to preclude the possibility of explosion.

The prior art techniques for accomplishing these tasks are expensive, complex, and often result in mere transfer of the environmental problem to another location. The present invention provides a method for economically decontaminating soils or degassing tanks without creating other environmental impact.

Vacuum extraction of landfill gases containing naturally produced methane has been a commonly used technology for many years. The methane collected in this manner is either flared or stored to be burned as a source of energy. Recent laboratory studies and field projects have demonstrated the feasibility of removing heavier hydrocarbon vapors such as those produced by gasoline using the vacuum extraction technique.

Vacuum applied by means of a blower or vacuum pump of common manufacture to a perforated well casing placed within the soil creates a pressure gradient in the soil surrounding the casing. Heavy hydrocarbons present in the soil are volatilized and the vapors migrate through the perforations in the casing into the casing and are drawn to the vacuum source. The hydrocarbon vapor exhausted through the pump or blower is typically discharged directly into the atmosphere.

The discharge of hydrocarbon vapors from soil contamination sites or in the process of degassing tanks may pollute the atmosphere. The development of strict air quality regulations in many parts of the United States proscribes such discharges as environmentally unacceptable.

Two prior-art technologies have commonly been used to prevent the discharge of hydrocarbon vapors. The first of these technologies uses activated carbon inside a vessel or series of vessels to adsorb the vapors. A typical adsorption ratio is 1 pound adsorbed hydrocarbon to 7 pounds activated carbon. A very large amount of activated carbon is required to adsorb a small amount of hydrocarbon vapor. Further, the contaminated carbon must itself be disposed of. Transportation of the contaminated carbon to a hazardous waste disposal site merely transfers the pollution problem from one location to another. The spent carbon may be reprocessed; however, during reprocessing, the hydrocarbon vapor must be destroyed. In either case, transportation of large quantities of spent carbon is expensive and inconvenient.

The second prior-art technology destroys hydrocarbon vapors by catalytic oxidation. The hydrocarbon vapors are introduced into a large incinerator containing a precious metal catalyst such as platinum. Catalytic conversion of large quantities of hydrocarbon vapor requires the use of large catalytic beds of complex and sophisticated design. The catalyst must accommodate a wide range of hydrocarbon concentrations commonly encountered. The catalytic oxidation process also requires the addition of external heat. Under most circumstances, this requires a supplemental heat source such as electric heating coils or a supplemental hydrocarbon fuel.

Both prior-art technologies are expensive and complex.

SUMMARY OF THE INVENTION

The present invention provides an apparatus and method for volatilizing and aspirating hydrocarbons from contaminated soil or from empty storage tanks and rendering the hydrocarbon vapor environmentally acceptable. An internal combustion engine is used to provide vacuum through the intake manifold for extraction of the hydrocarbon vapor. The hydrocarbon vapor is then combusted in the engine forming primary combustion products of carbon dioxide and water.

The addition of a catalytic converter to the exhaust of the engine provides for further reduction in pollutant emissions. Unlike the prior art, the catalytic converter used by the invention is of small size and a simple conventional design, normally used for automobile exhaust emission control.

The removal of heavy hydrocarbons from contaminated soil may be accomplished using the present invention. The vacuum present in the intake manifold of the internal combustion engine is exposed to the contaminated soil through an interface composed of a cylindrical casing placed in the soil with perforations in the zone of the contamination. The vacuum present in the interface means creates a pressure gradient in the soil. This reduced pressure volatilizes the hydrocarbons present in the soil and they are drawn to the interface means where they accumulate and are drawn into the intake manifold of the engine.

This technique may be used for in situ removal of hydrocarbon present from a spill or underground leakage. A conventional well with a perforated well casing in the region of the contamination provides the interface for extraction of the hydrocarbon vapors.

For removal of hydrocarbon vapors from contaminated soil that has been previously excavated, a cylindrical perforated casing may be placed in the excavated soil with the use of conventional earth moving equipment.

Degassing of a storage tank is conducted in a similar fashion. A hose or conduit is attached to a first opening in the storage tank providing the interface for collection of the hydrocarbon vapor. A second opening in the storage tank with a controllable valve is used to maintain the desired vacuum level in the tank during operation of the invention.

In each of the techniques above, starting of the engine and initial operation is conducted using a supplemental fuel. The engine is started and allowed to run smoothly using the supplemental fuel. The interface for the collection of the hydrocarbon vapors is gradually exposed to the vacuum of the intake manifold of the engine. As pressure is reduced in the interface, hydrocarbon vapor begins to be accumulated and flow into the intake manifold of the engine. As the hydrocarbon vapors begin combusting in the engine, the flow of supplemental fuel may be reduced to achieve smooth operation of the engine. In some cases the supplemental fuel may be eliminated entirely once smooth operation of the engine on the vented hydrocarbon vapor is achieved. Additional control of the engine is provided by controlling the air intake into the engine both for the supplemental fuel and a secondary air intake.

The majority of the hydrocarbon vapors are burned in the engine. The small fraction of the vapors that may enter the exhaust in the unburned state, together with the combustion products of the engine, may be removed from the exhaust using a standard catalytic converter.

The present invention provides a simple, relatively inexpensive alternative to the prior art for the accumulation and destruction of hydrocarbon vapors. Unlike the carbon adsorption technique, the present invention is self-contained and the hydrocarbon vapor is destroyed on site. Transportation of hazardous material such as the contaminated activated carbon and costly reprocessing or secondary storage is not required. The cost and complexity of catalytic incineration of hydrocarbon vapors using large catalytic converters is avoided by the present invention.

The use of an inexpensive internal combustion engine to destroy the majority of the hydrocarbon vapor supplemented with a small catalytic converter of common manufacture, where necessary, provides a significant improvement in both cost and complexity. The present invention provides a synergistic combination which uses the hydrocarbon vapors being removed as fuel for the process. The overall energy use is thus significantly reduced and the need for supplemental vacuum pumps or powered blowers is eliminated.

BRIEF DESCRIPTION OF THE DRAWINGS

FIG. 1 is a general schematic representation of the elements of the invention;

FIG. 2 is a specific schematic representation of an embodiment of the supplemental fuel system intake manifold arrangement and various controls;

FIG. 3 is a schematic representation of an embodiment of the hydrocarbon vapor interface for use with loose excavated soil; and FIG. 4 is a schematic representation of the interface and control means for use with a storage tank, or the like, to be degassed.

DETAILED DESCRIPTION OF THE PREFERRED EMBODIMENT

The drawings show three embodiments of the invention for representative uses. A single supplemental fuel implementation is shown for all three. Those skilled in the art will recognize alternatives to the embodiments shown, which fall within the intent and scope of the present invention.

Referring now to FIG. 1, the embodiment of the invention shown provides an internal combustion engine 10 having an intake manifold 12 and an exhaust manifold 14. An interface means 16 is provided for accumulating the hydrocarbon vapor. In the embodiment shown in FIG. 1, the interface means 16 is provided for in situ removal of hydrocarbon vapors from the soil. A standard cylindrical well casing 18 is provided in a well 20 drilled into the contaminated soil 22. Perforations 24 in the cylindrical casing 18 allow vapor to flow into the casing for accumulation and transmission to the engine intake manifold 12. A suitable well packing material 26 is provided to preclude blockage of the perforations 24. An end plug 28 is provided to seal the cylindrical casing 18. A suitable wellhead sealing material 30 is provided for the upper extremity of the well 20. A connecting means 32 which will be described in detail subsequently is provided for connecting the interface means 16 to the intake manifold 12 of the internal combustion engine 10. A supplemental fuel source 34 and its associated carburetion means 36, which will be described in more detail subsequently, is also connected to the intake manifold 12. A catalytic converter 37 may be attached to the exhaust manifold 14 where required to further reduce pollutant emission.

Details of the operating elements of the invention are shown in FIG. 2. Attached to the intake manifold 12 of the internal combustion engine 10 is a mixing chamber 38. The connection means 32 comprises a vapor vacuum manifold 40 which is connected to the mixing chamber 38. A vapor control valve 42 is provided between the vapor vacuum manifold 40 and the mixing chamber 38. A controllable air inlet 44 provides secondary air to the vapor vacuum manifold. The vapor vacuum manifold 40 communicates engine vacuum present in the intake manifold 12 to the interface means 16. Hydrocarbon vapor collected in the interface means 16 is transmitted through the vapor vacuum manifold 40 into the mixing chamber 38 and subsequently into the engine 10 through the intake manifold 12. The supplemental fuel carburetion means 36 is also connected to the mixing chamber 38. For the embodiment shown in the drawings, the carburetion means 36 comprises an LPG carburetor 46, an LPG regulator 48, a needle valve 50, a vacuum operable valve 52 and its associated vacuum line 54. The vacuum operable valve 52 provides for interruptible connection of the supplemental fuel source 34 to prevent the flow of fuel from the fuel source 34 when the engine is not operating. A second controllable air inlet 56 is provided to supply air to the LPG carburetor. A standard air filter 58, may be connected to the second controllable air inlet 56. An appropriate throttle means 60, placed between the LPG carburetor 46 and the mixing chamber 38 may be used to control the operating speed of the engine 10.

The invention may be employed for collection of hydrocarbon vapor in situ where a spill has occurred or underground leakage has contaminated the soil as shown in FIG. 1. The invention may also be used to decontaminate soil which has been excavated from a spill site, as shown in FIG. 3. For this embodiment, the interface means 16 comprises an elongate capped casing 62 which may be identical to the cylindrical well casing 18 shown in FIG. 1. A substantial portion of the length of the casing 62 contains perforations 64. The perforated portion of the casing 62 is embedded in the excavated soil 66. An appropriate filtering material 68 prevents blockage of the perforations 64. Installation of the interface means 16 may be accomplished using standard earthmoving equipment.

The present invention may be used for degassing of underground, above ground or transportable tanks, as shown in FIG. 4. A connection means 70 runs from the storage tank 72 to the vapor vacuum manifold 40 of FIG. 2. The connection means 70 may be a flexible hose 74, attached with an airtight seal to an available port 76 on the tank 72. A suitable venting means 78 is provided for maintaining a desired vacuum level in the tank 72 during degassing. A standard valve mounted on a second port in the tank provides a suitable method for controlling the pressure in the tank. Location of the second port on a portion of the tank distant from the first port 76 allows optimum degassing of the tank 72.

Operation of the embodiment of the invention shown in the drawings is conducted as follows. The interface 16 is inserted in the soil to be decontaminated. This is accomplished using standard drilling techniques for in situ removal of hydrocarbons as shown in FIG. 1 or by the use of standard excavating equipment where soil has been removed from the spill site as shown in FIG. 3. The vapor vacuum manifold 40 is connected to the interface means 16 and the mixing chamber 38 for communication with the intake manifold 12 of the engine 10. Initially the vapor control valve 42 is closed to prevent communication between the mixing chamber 38 and the vacuum vapor manifold 40. The first controllable air inlet 44 to the vapor vacuum manifold 40 is also closed. The engine 10 is started using the supplemental fuel source 34. Starting of the engine 10 is accomplished by cranking the engine with a standard starter. Cranking of the engine draws vacuum through the intake manifold 12 and the mixing chamber 38 to the LPG gas carburetor 46. Vacuum is transmitted through the vacuum line 54 to the vacuum operable valve 52 which is then opened allowing fuel to flow from the supplemental fuel source 34 to the LPG regulator 48. The LPG is pressure regulated and vaporized by the LPG regulator 48 and fed to the engine through the LPG carburetor 46. Once the engine has started, speed control and smoothness of the engine are controlled using the throttling means 60 and the needle valve 50. During the initial starting, the second controllable air inlet 56 to the LPG carburetor is open. Once the engine 10 is operating smoothly, the vapor control valve 42 is opened slowly to expose the vapor vacuum manifold 40 to the vacuum present in the mixing chamber 38 and inlet manifold 12. The vacuum in the vapor vacuum manifold 40 is transmitted to the interface means 16, eventually reducing pressure in the contaminated soil 22 surrounding the interface means. A pressure gradient is established in the soil, and the hydrocarbon vapor volatilized by the reduced pressure is drawn into the interface means 16 and then into the vapor vacuum manifold 40. As the hydrocarbon vapors begin to flow through vapor control valve 42 into the mixing chamber 38 and then into the engine 10 through the intake manifold 12, the throttle means 60 and the needle valve 50 are adjusted to maintain smooth operation of the engine. As greater hydrocarbon vapor volume flows to the engine 10, the first controllable air inlet 44 may be opened to provide adequate air mixing with the hydrocarbon vapor to produce satisfactory combustion in the engine 10. Reduction in the supplemental fuel and air flowing through the LPG carburetor 46 is accomplished by controlling or closing needle valve 50 and the second controllable air inlet 56. As the flow of the hydrocarbon vapor through the vapor vacuum manifold 40 stabilizes, adjustments to the vapor control valve 42, the first controllable air inlet 44, the needle valve 50 and the second controllable air inlet 56 maintain smooth operation of the engine. Under ideal conditions, the supplemental fuel source may be shut off entirely using needle valve 50 and the engine 10 operated solely on the hydrocarbon vapor being withdrawn through the vapor manifold 40.

If the invention is being used for degassing of a tank as shown in FIG. 4, the flexible hose 74 is attached to the vacuum manifold 40 and the first inlet 76 into the tank 72. An airtight seal between the first inlet 76 and the flexible hose 74 is desirable. Engine start up is as previously described. Once the engine is operating the vapor control valve 42 is opened slowly, reducing pressure through the vapor vacuum manifold 40 and the flexible hose 74 drawing the hydrocarbon vapor from the tank 72 through the first inlet 76. As the pressure is reduced in the tank, the controllable venting means 78 is opened to maintain the desired pressure gradient in the tank. Adjustment of the invention for operation partially or totally on the hydrocarbon vapors drawn from the tank is as described previously.

Attaching a catalytic converter 37 as shown in FIG. 1 further reduces the pollutant emissions from the invention. Any unburned hydrocarbon vapor or combustion products of the supplemental fuel or the hydrocarbon vapor are oxidized by the catalytic converter 37 allowing the invention to meet very stringent air quality regulations.

Any suitable spark ignited industrial or automotive engine may be used in the invention. Appropriate modifications to these engines may be accomplished to use any of a number of fuels as the supplemental fuel. Such fuels as natural gas, methane, propane, LPG, methanol, or gasoline may be used as the supplemental fuel. Gaseous fuels such as natural gas, propane, methane, or, as shown in the preferred embodiment, LPG provide for ease of modification and operation of the invention in practice.

Having now described the invention in detail in accordance with the requirements of the patent statutes, those skilled in this art will have no difficulty in making changes and modifications to the supplemental fuel, engine or accumulating means in order to meet specific requirements or conditions. Such changes and modifications may be made without departing from the scope and spirit of the invention as set forth in the following claims.

What is claimed is:

1. An apparatus for volatilizing and aspirating hydrocarbons and rendering the hydrocarbon vapor environmentally safe by combustion comprising:
   an internal combustion engine having an intake manifold and an exhaust manifold;
   interface means for accumulating volatilized hydrocarbons as a primary fuel source, the interface means comprising an elongated capped casing having perforations in a portion of its length, the perforated portion embedded in contaminated ground or soil;
   a vapor vacuum manifold for operably connecting the interface means to the intake manifold of the internal combustion engine; and
   a supplemental fuel source interruptibly connected to the intake manifold.

2. An apparatus as defined in claim 1 further comprising a catalytic converter attached to the exhaust manifold.

3. An apparatus for volatilizing and aspiring hydrocarbons and rendering the hydrocarbon vapor environmentally safe by combustion comprising:
   an internal combustion engine having an intake manifold and an exhaust manifold;

a mixing chamber attached to the intake manifold;

a vapor vacuum manifold attached to the mixing chamber;

a vapor control valve intermediate the mixing chamber and the vapor vacuum manifold;

a controllable first air inlet to the vapor vacuum manifold;

interface means for communicating engine vacuum and accumulating the volatilized hydrocarbons to be eliminated, the interface means comprising an elongated casing having perforations in a portion of its length, the perforated portion adapted for embedding in contaminated ground or soil, and connected to the vapor vacuum manifold;

supplemental fuel carburetion means operably engaged to the mixing chamber;

a supplemental fuel source interruptibly connected to the carburetion means;

a controllable second air inlet to the carburetion means; and throttle means intermediate the carburetor and the mixing chamber.

4. An apparatus as defined in claim 3 in which the supplemental fuel carburetion means comprises an LPG carburetor and an LPG regulator, and the supplemental fuel source comprises an LPG tank connected to the LPG regulator through a vacuum operable valve.

5. A method for volatilizing and aspirating hydrocarbons and rendering the hydrocarbon vapor environmentally safe by combustion comprising:

providing an interface for collection of hydrocarbon vapors, the interface comprising an elongated casing having perforations in a portion of its length;

embedding the perforated portion of the casing in contaminated ground or soil;

attaching the intake manifold of an internal combustion engine to the interface; and operating the internal combustion engine whereby vacuum created by the engine on the intake manifold is transmitted to the interface to volatilize and draw hydrocarbons into the engine to be combusted as fuel and thereby destroyed.

6. A method as in claim 5 further comprising the step of converting the exhaust from the engine catalytically to further reduce pollutant emission.

7. A method for volatilizing and aspirating hydrocarbons and rendering the hydrocarbon vapor environmentally safe by combustion comprising:

providing an interface for collection of hydrocarbon vapor, the interface comprising an elongated casing having perforations in a portion of its length;

embedding the perforated portion of the casing in contaminated ground or soil;

attaching the intake manifold of an internal combustion engine to the interface;

providing a supplemental fuel source to the internal combustion engine;

starting the engine using the supplemental fuel source;

exposing the interface to the intake manifold gradually to reduce pressure in the interface, thereby volatilizing hydrocarbons and drawing the hydrocarbon vapor into the intake manifold;

reducing the supplemental fuel flow to the engine;

adjusting the supplemental fuel and air sources as required to maintain smooth engine operation while drawing the maximum hydrocarbon vapor from the interface; and converting the engine exhaust catalytically to further reduce pollutant emission.

8. An apparatus for volatilizing and aspirating hydrocarbons and rendering the hydrocarbon vapor environmentally safe by combustion comprising:

interface means for collection of hydrocarbon vapors, the interface means comprising an elongated casing having perforations in a portion of its length, the perforated portion adapted for embedding in contaminated ground or soil;

means for attaching the intake manifold of an internal combustion engine to the interface means;

means for operating the internal combustion engine whereby vacuum created by the engine on the intake manifold is transmitted to the interface means volatilizing and drawing hydrocarbon vapor into the engine to be combusted as fuel and thereby destroyed; and means for controlling a supplemental fuel source for engine starting and maintaining minimum combustible mixture in the engine when collected hydrocarbon vapors are insufficient.

9. An apparatus for volatilizing and aspirating hydrocarbons and rendering the hydrocarbon vapor environmentally safe by combustion comprising:

an interface means for collection of hydrocarbon vapors, the interface means comprising an elongated casing having perforations in a portion of its length, the perforated portion adapted for embedding in contaminated ground or soil;

means for attaching the intake manifold of an internal combustion engine to the interface means;

means for providing a supplemental fuel source to the internal combustion engine;

means for starting the engine using the supplemental fuel source;

means for exposing the interface means to the intake manifold gradually to reduce pressure in the interface means, thereby volatilizing hydrocarbons and drawing the hydrocarbon vapor into the intake manifold;

means for reducing the supplemental fuel flow to the engine;

means for adjusting the supplemental fuel and air sources as required to maintain smooth engine operation while drawing the maximum hydrocarbon vapor from the interface means; and means for converting the engine exhaust catalytically to further reduce pollutant emission.

* * * * *